(12) United States Patent
Lee et al.

(10) Patent No.: US 12,540,625 B2
(45) Date of Patent: Feb. 3, 2026

(54) FAN AND MANUFACTURING METHOD THEREFOR

(71) Applicant: AMOTECH CO., LTD., Incheon (KR)

(72) Inventors: Hong Geun Lee, Incheon (KR); Hee Chul Uhm, Incheon (KR); Se Ki Lee, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 61 days.

(21) Appl. No.: 18/706,046

(22) PCT Filed: Nov. 3, 2022

(86) PCT No.: PCT/KR2022/017096
§ 371 (c)(1),
(2) Date: Oct. 4, 2024

(87) PCT Pub. No.: WO2023/080661
PCT Pub. Date: May 11, 2023

(65) Prior Publication Data
US 2025/0305504 A1     Oct. 2, 2025

(30) Foreign Application Priority Data
Nov. 5, 2021 (KR) .................. 10-2021-0151378

(51) Int. Cl.
*F04D 25/06* (2006.01)
*F04D 25/08* (2006.01)
(Continued)

(52) U.S. Cl.
CPC ......... *F04D 25/0646* (2013.01); *F04D 25/08* (2013.01); *F04D 29/053* (2013.01);
(Continued)

(58) Field of Classification Search
CPC .... F04D 25/0646; F04D 25/08; F04D 29/053; F04D 29/056; F04D 29/325; F04D 29/522; F05D 2230/23; F05D 2260/30
See application file for complete search history.

(56) References Cited

U.S. PATENT DOCUMENTS 6,376,946 B1 * 4/2002 Lee ..................... H02K 5/1675
310/90
6,654,213 B2 * 11/2003 Horng .................... H02K 1/187
310/67 R
(Continued)

FOREIGN PATENT DOCUMENTS

KR    20090038618 A    4/2009
KR    20100035068 A    4/2010
(Continued)

OTHER PUBLICATIONS

International Search Report—PCT/KR2022/017096 dated Feb. 9, 2023.

*Primary Examiner* — Jesse S Bogue
(74) *Attorney, Agent, or Firm* — CANTOR COLBURN LLP

(57) ABSTRACT

Provided are a fan capable of preventing oil-scattering without using an oil-scattering prevention washer and simultaneously preventing the escape of a rotary shaft due to a lift, and a manufacturing method therefor. The fan includes: a cylindrical fan housing; a base having a bearing housing integrally formed therewith, the bearing housing protruding from the rear surface of the fan housing to the center portion thereof; a sleeve bearing inserted in the bearing housing; a rotary shaft of which the lower portion is rotatably supported by the sleeve bearing; a rotor fixed to the upper portion of the rotary shaft; a stator which is coupled to the outer circumference of the bearing housing, and is arranged with a predetermined gap from the rotor; and an impeller which is integrally formed with the outer circumference of the rotor.

11 Claims, 9 Drawing Sheets

(51) Int. Cl.
*F04D 29/053* (2006.01)
*F04D 29/056* (2006.01)
*F04D 29/32* (2006.01)
*F04D 29/52* (2006.01)

(52) U.S. Cl.
CPC ......... *F04D 29/056* (2013.01); *F04D 29/325* (2013.01); *F04D 29/522* (2013.01); *F05D 2230/23* (2013.01); *F05D 2260/30* (2013.01)

(56) References Cited

U.S. PATENT DOCUMENTS

| | | | | |
|---|---|---|---|---|
| 6,954,017 B2 * | 10/2005 | Takahashi | ............... | F16C 33/74 |
| | | | | 310/90 |
| 8,207,643 B2 * | 6/2012 | Horng | ................. | H02K 5/1675 |
| | | | | 310/90 |
| 8,388,319 B2 * | 3/2013 | Horng | ................... | H02K 1/187 |
| | | | | 310/90 |
| 9,006,944 B2 * | 4/2015 | Horng | ................... | H02K 1/187 |
| | | | | 310/90 |
| 10,260,510 B2 * | 4/2019 | Narita | ...................... | H02K 5/08 |
| 2003/0222522 A1 * | 12/2003 | Chang | ................... | H02K 7/085 |
| | | | | 310/90 |
| 2008/0267793 A1 * | 10/2008 | Yang | ................... | F04D 25/0646 |
| | | | | 417/354 |

FOREIGN PATENT DOCUMENTS

| KR | 101800456 B1 | 11/2017 |
|---|---|---|
| KR | 20180066350 A | 6/2018 |

* cited by examiner

FAN AND MANUFACTURING METHOD THEREFOR

TECHNICAL FIELD

The present invention relates to a fan and, more specifically, to a fan capable of preventing oil-scattering without using a separate oil-scattering prevention washer and simultaneously preventing the escape of a rotary shaft due to a lift, and a manufacturing method therefor.

BACKGROUND ART

The air conditioner of the vehicle measures indoor temperature, humidity, and fine dust in order to implement a pleasant environment inside the vehicle, performs indoor cooling and heating based on the temperature and humidity data, and drives an electric dust collection filter or the like based on the fine dust data.

One of the ways to check indoor temperature and humidity is to use a motor equipped in an in-car sensor to create a forced air flow while inhaling indoor air to measure temperature and humidity to thereby check the environmental condition inside the vehicle.

In addition, as the interest in fine dust has recently increased, the concentration of fine dust is measured to check the indoor condition. Fine dust measurement also uses a method of measuring fine dust contained in indoor air by inhaling the indoor air using a motor provided in a fine dust sensor.

In-car sensors and fine dust sensors are also installed on a car's grill or instrument panel, and the indoor air of the car is sucked in by an aspirator method to detect the temperature of the indoor air and concentration of fine dust (or the amount of fine dust). In this case, the fine dust sensor may measure the amount of fine dust by irradiating predetermined light to the inhaled indoor air to measure the amount of light scattered due to the fine dust in the air.

Conventional blowing fans (i.e., aspiration motors) installed on the flow path to inhale the indoor air of the car are small and do not require precise and complex speed control, and thus, a single-phase motor having a simple structure and using one coil is used.

In a conventional aspiration motor, a bushing made of brass, which serves as a bearing housing, is formed at the center of a housing made of a resin, by insert injection, and a sleeve bearing is inserted into the bushing to rotatably support the rotary shaft of a rotor.

In addition, a support sheet for reducing the rotational resistance of the rotary shaft is inserted in the lower portion of the bearing housing and oil is impregnated therein. In this case, when the temperature rises due to the rotation of the rotor, the air and oil inside the bearing housing expand in volume due to thermal expansion, and the oil may rise and scatter along the rotary shaft. In this case, when a bearing housing made of metal is press-fitted into a housing made of resin, heat dissipation is poor, and thus, if the temperature rise increases, oil-scattering is likely to occur.

An oil cap or O-ring is assembled at the inlet of the bearing housing to prevent such oil from scattering.

Furthermore, when assembling a stator to a bushing, a conventional aspiration motor necessarily requires bonding and caulking work to the contact surface between the stator and the bushing to prevent the escape and rotation of the stator, resulting in a decrease in productivity.

In addition, conventional aspiration motors adopt a structure in which a slit washer is coupled to a groove formed at the lower end of the rotary shaft to prevent the escape of the rotary shaft due to a lift when the rotor (impeller) rotates. However, in this case, in the case that the rotary shaft is raised due to the lift, when the rotor (impeller) rotates, the slit washer contacts the sleeve bearing, causing noise.

DISCLOSURE

Technical Problem

Accordingly, the present invention provides a fan capable of preventing oil-scattering without using a separate oil-scattering prevention washer and preventing the escape of a rotary shaft due to a lift by forming an extension portion so that an oil-scattering prevention portion formed on the upper portion of a bobbin, which defines a coil winding region of a stator core, is close to an escape prevention groove of the rotary shaft.

The present invention provides a fan capable of preventing oil-scattering without using a separate oil-scattering prevention washer by extending and forming an oil-scattering prevention portion of a bobbin to the inside of a bearing housing and extending a lower end portion of a shaft support portion supporting a rotary shaft of an impeller to be close to the inside of a through-hole of the bobbin.

The present invention provides a fan and a manufacturing method therefor, wherein, when a stator is assembled to a bearing housing, a plurality of connection protrusions extending from the bearing housing are coupled to a through-hole of the stator, and then an exposed front end portion is fixed by means of a high-frequency thermal fusion method, thereby simply enabling the escape and rotation of the stator.

Technical Solution

According to an aspect of the present invention, there is provided a fan including: a fan housing having a cylindrical inner circumferential portion; a base connected to the rear surface of the fan housing through a plurality of bridges and having a bearing housing protruding and integrally formed at a central portion thereof; a sleeve bearing inserted into the bearing housing; a rotary shaft of which a lower portion is rotatably supported by the sleeve bearing; a rotor fixed to an upper portion of the rotary shaft; a stator which is fixed on the base, has an inner circumferential portion coupled to an outer circumference of the bearing housing, and is arranged with a predetermined gap from the rotor; and an impeller which is integrally formed on an outer circumference of the rotor and rotates together, wherein the stator includes: a stator core in which an inner circumferential portion of a back yoke is fixed to an outer circumferential surface of the bearing housing and a plurality of teeth on which a coil is wound are extended; a bobbin surrounding the teeth and the back yoke of the stator core and having an oil-scattering prevention portion located on an upper surface thereof extending to the inside of the bearing housing; and the coil wound around the coil winding region of the bobbin and to which a motor driving signal is applied, wherein the inner circumferential portion of the oil-scattering prevention portion is extended to be close to an escape prevention groove of the rotary shaft.

The inner diameter of a through-hole provided in the inner circumferential portion of the oil-scattering prevention portion may be set to be less than the outer diameter of the rotary shaft and greater than the outer diameter of the escape prevention groove.

The fan according to the present invention may further include an inclined portion formed around the through-hole to guide the lower end of the rotary shaft to be inserted into the through-hole.

In addition, the upper end of the bearing housing may come into contact with the bottom of the oil-scattering prevention portion to induce return to the inside of the bearing housing while preventing oil-scattering.

The fan according to the present invention further includes: a plurality of connection protrusions protruding from an upper portion of the bearing housing; and a plurality of through-holes penetratively formed in the oil-scattering prevention unit and coupled with the plurality of connection protrusions, respectively, when the stator is assembled to the outer circumference of the bearing housing, wherein the front end portions exposed through the plurality of through-holes may be fixed to the upper portion of the oil-scattering prevention portion by thermal fusion.

In addition, the bobbin may further include a plurality of circular protrusions each extending from a portion surrounding the teeth and the back yoke between the teeth and having through-holes formed to support the plurality of connection protrusions, respectively.

Moreover, the oil-scattering prevention portion of the bobbin may be extended to the inside of the bearing housing, and a shaft support portion supporting the rotary shaft of the rotor may be extended so that the lower end thereof approaches the inside of the through-hole provided in the inner circumferential portion of the oil-scattering prevention portion.

In addition, the bearing housing may have a first end groove in which the sleeve bearing is press-fitted and a second end groove in which a lower end portion of the rotary shaft is located.

According to another aspect of the present invention, there is provided a method of manufacturing a fan, the method including: preparing a fan housing in which a base is connected to a rear surface of the fan housing through a plurality of bridges and a bearing housing protrudes from a central portion of the base to be integrally formed; injecting oil into the bearing housing and press-fitting a sleeve bearing to be assembled with the bearing housing; preparing a stator core in which an inner circumferential portion of a back yoke is fixed to an outer circumferential surface of the bearing housing and a plurality of teeth on which a coil is wound are extended, and then integrally forming a bobbin by insert injection using a resin wherein the bobbin surrounds the teeth and the back yoke of the stator core and an oil-scattering prevention portion located on an upper surface of the bobbin is extended to the inside of the bearing housing; completing a stator by winding a coil around the outer circumference of a coil winding region of the bobbin surrounding the teeth; coupling the stator to the outer circumference of the bearing housing to project the front ends of a plurality of connection protrusions protruding from the bearing housing to the upper portion of the bobbin through a plurality of through-holes formed in the oil-scattering prevention portion of the bobbin; thermally fusing the plurality of connection protrusions protruding to the upper portion of the bobbin to then be fixed thereto; and integrally forming an impeller on an outer circumference of a rotor and then assembling the lower end of a rotary shaft to a sleeve bearing by passing through a through-hole formed in an inner circumference of the oil-scattering prevention portion.

In this case, the inner circumferential portion of the oil-scattering prevention portion is extended to be close to an escape prevention groove of the rotary shaft.

In addition, the inner diameter of a through-hole formed in the inner circumferential portion of the oil-scattering prevention portion may be set to be less than the outer diameter of the rotary shaft and greater than the outer diameter of the escape prevention groove.

Moreover, the oil-scattering prevention portion of the bobbin may be extended to the inside of the bearing housing, and a shaft support portion supporting the rotary shaft of the rotor may be extended so that the lower end thereof approaches the inside of the through-hole provided in the inner circumferential portion of the oil-scattering prevention portion.

Advantageous Effects

As described above, according to the present invention, an extension portion is formed so that the oil-scattering prevention portion formed on the upper portion of the bobbin defining the coil winding region of the stator core approaches the escape prevention groove of the rotary shaft, thereby preventing oil-scattering without using a separate oil-scattering prevention washer and preventing the escape of the rotary shaft due to a lift.

As a result, according to the conventional art, noise was generated by coupling the slit washer to the rotary shaft, in order to prevent the escape of the rotary shaft. However, in the present invention, it is possible to prevent the escape of the rotary shaft without noise without using such a slit washer.

Furthermore, in the present invention, an oil-scattering prevention portion of a bobbin is extended to the inside of a bearing housing and a lower end portion of a shaft support portion supporting a rotary shaft of an impeller is extended to be close to the inside of a through-hole of the bobbin to thereby preventing oil-scattering without using a separate oil-scattering prevention washer.

In addition, in the present invention, when a stator is assembled to a bearing housing, a plurality of connection protrusions extending from the bearing housing are coupled to a through-hole of the stator, and then an exposed front end portion is fixed by means of a high-frequency thermal fusion method, thereby simply enabling the escape and rotation of the stator.

In other words, in this invention, the bushing made of brass serving as the bearing housing may be omitted by integrally forming the bearing housing on the base. The conventional problem of reducing a productivity due to bonding and caulking works on the contact surface of the stator and the bushing when the stator and the bushing are assembled in the conventional art, may be solved by fixing the front end of the connection protrusion extended from the bearing housing in a high frequency thermal fusion method, to thereby prevent the escape and rotation of the stator.

BEST MODE FOR CARRYING OUT THE INVENTION

Figure 1A:
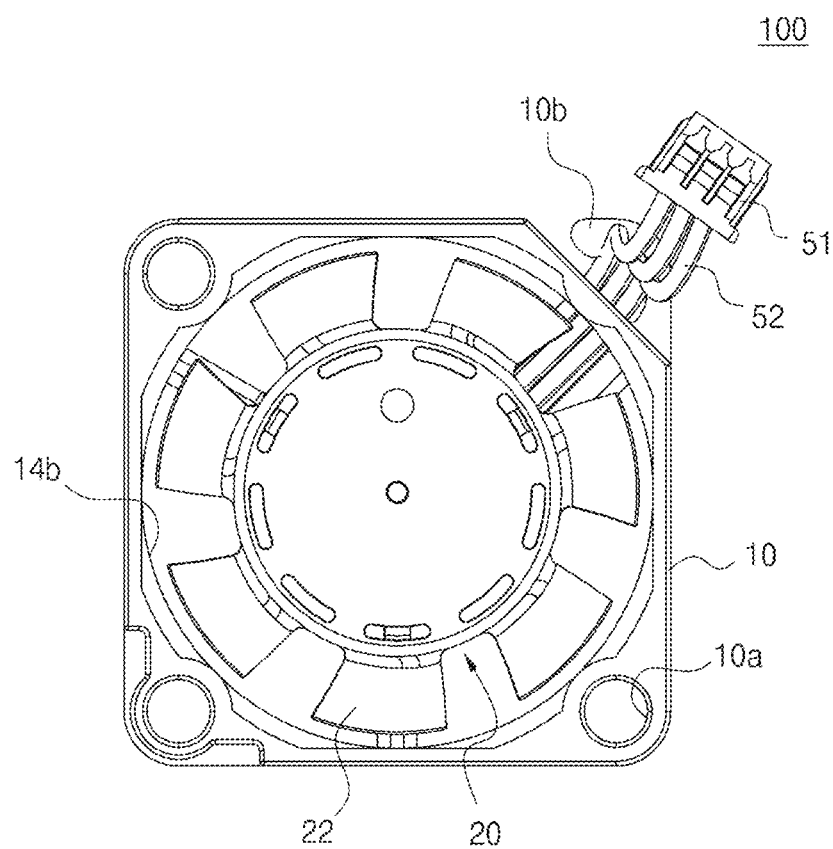
FIGS. 1A and 1B are a plan view and a perspective view, respectively, illustrating a fan according to a preferred embodiment of the present invention.

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

A fan according to the present invention is an axial flow fan in which external air is introduced from an air inlet on one side of a housing and then discharged to an air outlet on the other side in an axial direction, and may be used in a blowing fan installed in a flow path of a housing for a fine dust sensor or a cooling fan used to prevent overheating of electronic components.

Figure 1B:
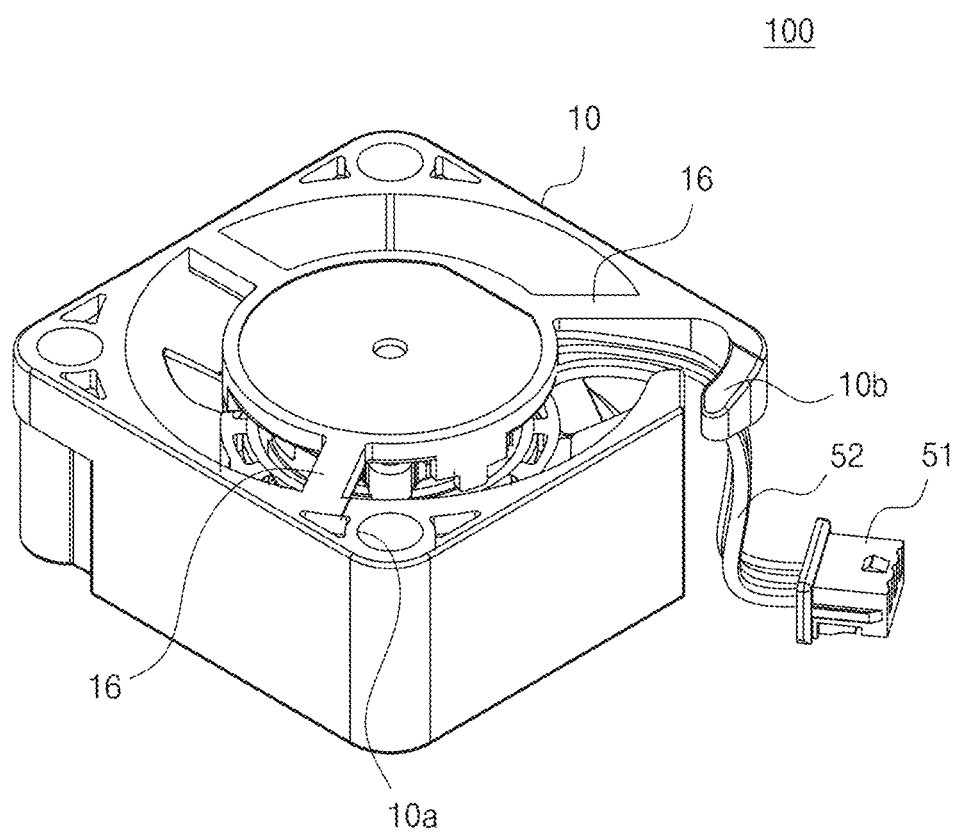
Figure 2:
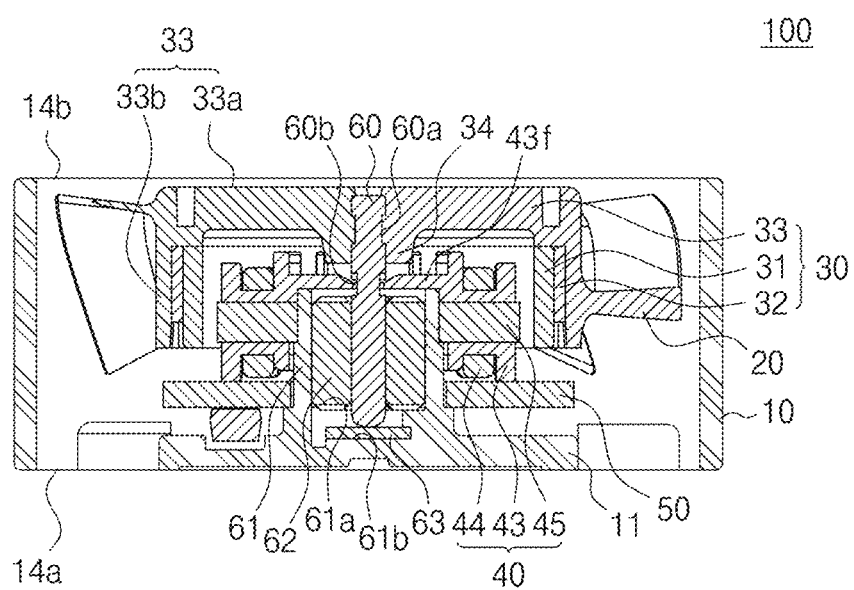
FIG. 2 is a cross-sectional view of a fan according to a first embodiment of the present invention.

FIGS. 1A and 1B are a plan view and a perspective view, respectively, illustrating a fan according to a preferred embodiment of the present invention. FIG. 2 is a cross-sectional view of a fan according to a first embodiment of the present invention.

First, as shown in FIGS. 1A to 2, a fan 100 according to an embodiment of the present invention includes: a fan housing 10 having an air outlet 14b for discharging air, formed on a front surface thereof and an air inlet 14a for introducing air, formed on a rear surface thereof; a base 11, which is connected from the rear surface of the fan housing 10 through a plurality of bridges 16, supports a sleeve bearing 62, a printed circuit board (PCB) 50, a stator 40, an impeller 20, and the like, and has an integrated bearing housing 61 protruding from the center thereof; the sleeve bearing 62 inserted into the bearing housing 61; a rotary shaft 60 of which a lower portion is rotatably supported by the sleeve bearing 62; a rotor 30 fixed to the upper portion of the rotary shaft 60; the stator 40, which is fixed to the base 11 and placed with a certain gap from the rotor 30; the impeller 20, which is integrally formed on the outer circumference of the rotor 30 and rotates together; and the PCB 50 fixed on the upper portion of the base 11 and placed under the stator 40 wherein various circuit components of a motor driving circuit for fan control are mounted on the PCB to supply a motor driving signal to the stator 40.

The fan housing 10 is open to allow air to pass through the front and rear surfaces as the base 11 is connected to the fan housing 10 through the plurality of bridges 16.

Figure 6:
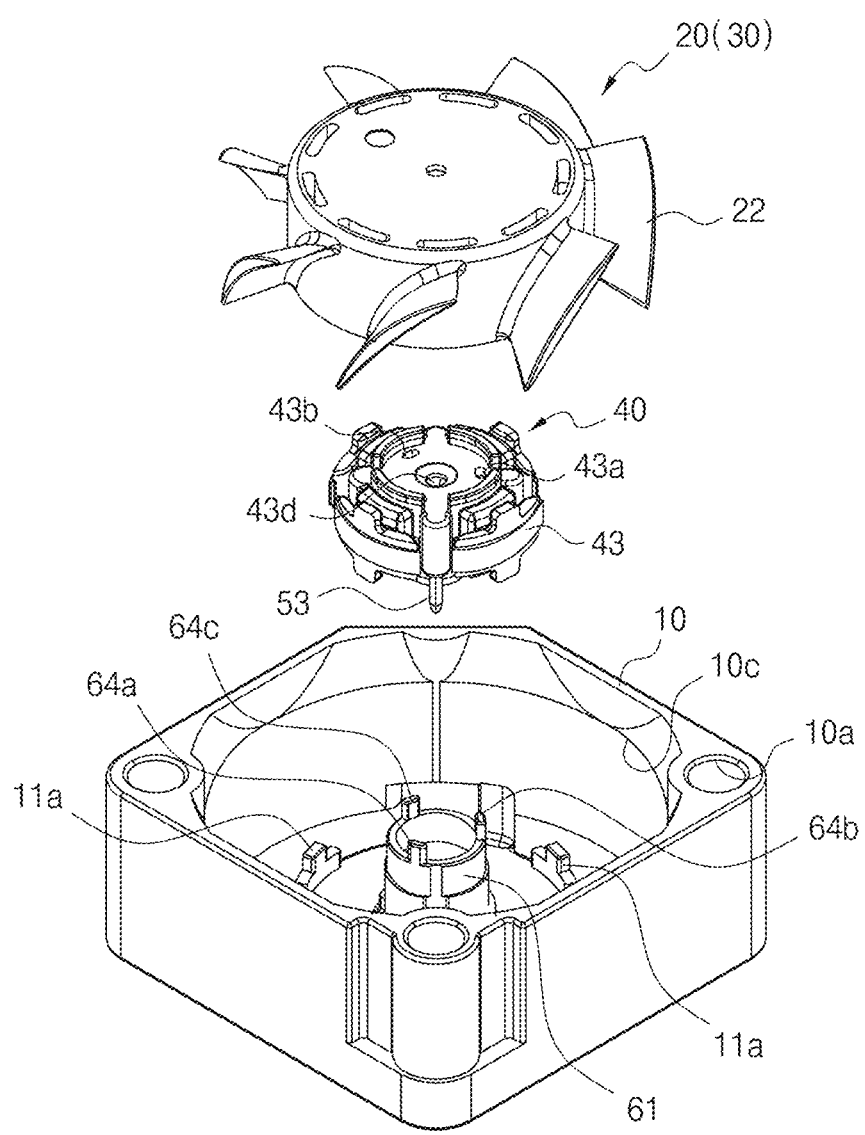
FIG. 6 is an exploded perspective view of each module of a fan according to a preferred embodiment of the present invention.

In addition, a plurality of guide protrusions 11a (FIG. 6) for guiding the PCB 50 fixed to the upper portion of the base 11 at intervals protrude from the outer circumference of the base 11.

Moreover, the fan housing 10 has a cylindrical inner circumference 10c and an approximately rectangular outer circumference. Through-holes 10a required to fix the fan 100 to a main body using fixing bolts or fixing screws are formed on three rectangular corners. A guide protrusion 10b protrudes from one remaining corner to guide a harness 52 drawn out from the PCB 50 to the outside.

The bearing housing 61 integrally formed with the base 11 has a two-stage recess structure, the sleeve bearing 62 is press-fitted into a first-stage recess 61a, and the lower end of the rotary shaft 60 is located in a second-stage recess 61b. A support sheet 63 for reducing the rotational resistance of the lower end of the rotary shaft 60 is inserted into the second-stage recess 61b, and oil is impregnated inside the bearing housing 61.

In this case, when the bearing housing 61 is formed of a resin, the support sheet 63 may be integrally formed by an insert molding method. The support sheet 63 may use, for example, a polyether ether ketone (PEEK), which is a colorless organic thermoplastic polymer of a polyaryl ether ketone series used in engineering applications as a highly heat-resistant resin.

The PCB 50 is formed in the form of a disk with an open center and inserted into the outer surface of the bearing housing 61. The harness 52 is connected to one side of the PCB 50 for electrical connection with the main body in which the fan 100 is used. The front end of the harness 52 is drawn out to the outside and an output connector 51 is connected thereto.

The bearing housing 61 is formed to protrude in a cylindrical shape in the center of the base 11, and the inner circumferential portion of the stator 40 is press-fitted and fixed to the outer surface thereof.

Figure 4:
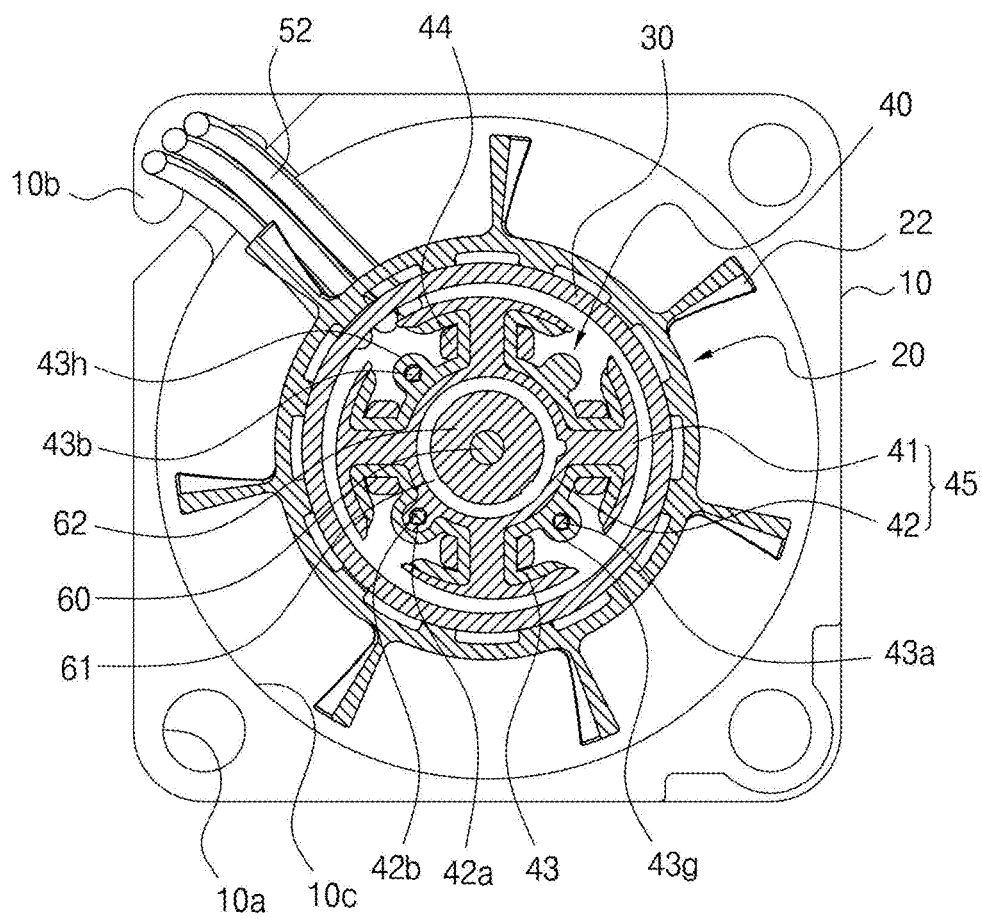
FIG. 4 is a cross-sectional view a fan in a diameter direction according to a preferred embodiment of the present invention.
Figure 5:
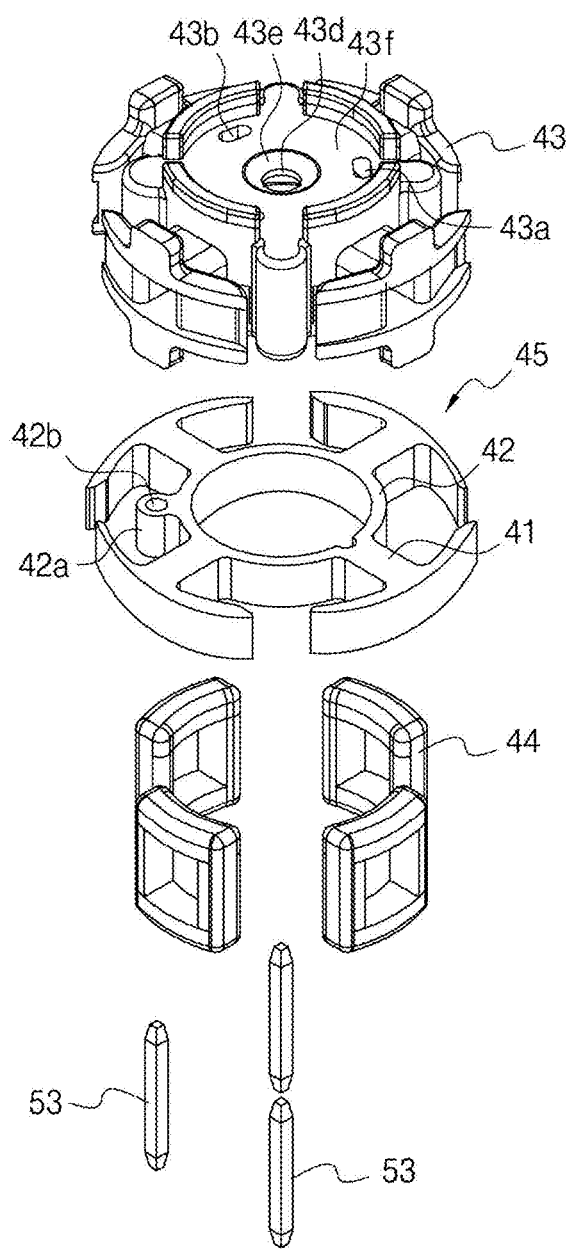
FIG. 5 is an exploded perspective view of a stator.

As shown in FIGS. 4 and 5, the stator 40 includes: a stator core 45 in which the inner circumference thereof is fixed to the outer circumferential surface of the bearing housing 61; a bobbin 43 surrounding a coil winding region and a back yoke 42 of the stator core 45; and a coil wound around the coil winding region of the bobbin 43 and to which a motor driving signal is applied.

The stator core 45 has a plurality of teeth 41 radially extending on the outside of an annular yoke 42, each tooth having a "T" shape. In this case, circular protrusions 42a each having a through-hole 42b may protrude from the outside of the annular yoke 42.

After assembling the stator 40 to the outer circumference of the bearing housing 61 as described later, one of a plurality of, for example, three connection protrusions 64a to 64c protruding from the bearing housing 61 may pass through the through-holes 42b of the circular protrusions 42a in order to fix the stator 40.

In addition, two of the three connection protrusions 64a to 64c are coupled to through-holes 43a and 43b formed in the circular protrusions 43g and 43h protruding from the bobbin 43 surrounding the back yoke 42, and the front end portions of the connection protrusions 64a to 64c protrude upward from the bobbin 43.

In this case, both the circular protrusion 42a and the circular protrusions 43g and 43h are arranged between the teeth and support the three connection protrusions 64a to 64c.

Moreover, an oil-scattering prevention portion 43f formed on the upper portion of the bobbin 43 extends to the center, forming only a small through-hole 43d in the center so that the rotary shaft 60 of the rotor 30 barely passes through the through-hole 43d, and the bottom surface of the oil-scattering prevention portion 43f is in contact with the upper end of the bearing housing 61. The upper end of the bearing housing 61 is in contact with the bottom of the oil-scattering prevention portion 43f, thereby inducing a return to the inside of the bearing housing 61 while preventing oil-scattering.

Meanwhile, the rotor 30 includes: a magnet 31, which is placed with a certain gap on the outer circumferential surface of the stator 40, is formed in a cylindrical shape, and has a structure in which N poles and S poles are alternately arranged, or N poles and S poles are alternately divided and magnetized; a back yoke 32 arranged on the outer circumferential surface of the magnet 31; and a rotor support 33 in which the magnet 31 and the back yoke 32 are fixed and the impeller 20 is integrally formed.

The rotor support 33 includes: a disk portion 33a in which the rotary shaft (60) is connected to the center and is formed in a disk shape; a shaft support 34 that vertically extends from the center of the disk portion 33a to support the rotary shaft 60; and a cylindrical portion 33b that extends vertically from the edge of the disk portion 33a, has the magnet 31 and the back yoke 32 fixed on the inner surface, and includes an impeller 20 formed on the outer surface.

The impeller 20 is integrally formed with the rotor support 33 and includes a plurality of blades 22 radially formed on the cylindrical portion 33b of the rotor support 33. In other words, insert injection is performed while the magnet 31, the back yoke 32, and the rotary shaft 60 are placed in a mold, and a blade 22 of the impeller 20 and the rotor support 33 are integrally formed, and the rotary shaft 60, the magnet 31 and the back yoke 32 are fixed by insert molding.

The rotary shaft 60, which is integrally formed in the center of the rotor support 33 by an insert injection method, includes: an annular first recess 60a to prevent an escape while increasing a mutual coupling area with the rotor support 33; and an annular escape prevention groove 60b to prevent the rotary shaft 60 from escaping from the sleeve bearing 62 once the lower end of the rotary shaft 60 passes through the through-hole 43d of the bobbin 43 by means of a press fitting method to then be coupled to the sleeve bearing 62.

In this case, an inclined portion 43e is formed around the through-hole 43d to more easily guide the entry of the lower end of the rotary shaft 60 when the lower end of the rotary shaft 60 is inserted into the through-hole 43d.

In this invention, the inner diameter of the through-hole 43d is desirably set less than the outer diameter of the rotary shaft 60 and greater than the outer diameter of the escape prevention groove 60b.

As a result, when the lower end of the rotary shaft 60 passes through the through-hole 43d of the bobbin 43 in a press-fitting manner and is once coupled to the sleeve bearing 62, even though a lift is generated such that the impeller 20 and the rotary shaft 60 rise according to the rotation of the rotor 30, the lower end of the escape prevention groove 60b may be caught on the chin of the through-hole 43d, preventing the rotary shaft 60 from escaping from the sleeve bearing 62.

In addition, as shown in FIG. 2, only a small through-hole 43d is formed in the center of the oil-scattering prevention portion 43f of the bobbin 43 so that the rotary shaft 60 of the rotor 30 may barely pass through, and the bottom surface of the oil-scattering prevention portion 43f is in contact with the upper end of the bearing housing 61.

As a result, in this invention, by forming an extension portion so that the oil-scattering prevention portion 43f of the bobbin 43 is close to the escape prevention groove 60b of the rotary shaft 60, air and oil inside the bearing housing 61 are caught on the bottom of the oil-scattering prevention portion 43f and return to the inside of the bearing housing 61 even if the air and oil rise along the rotary shaft 60 due to thermal expansion. Therefore, in this invention, oil-scattering may be prevented without using a separate oil-scattering prevention washer, thereby improving the efficiency of man power (man hour).

Figure 7:
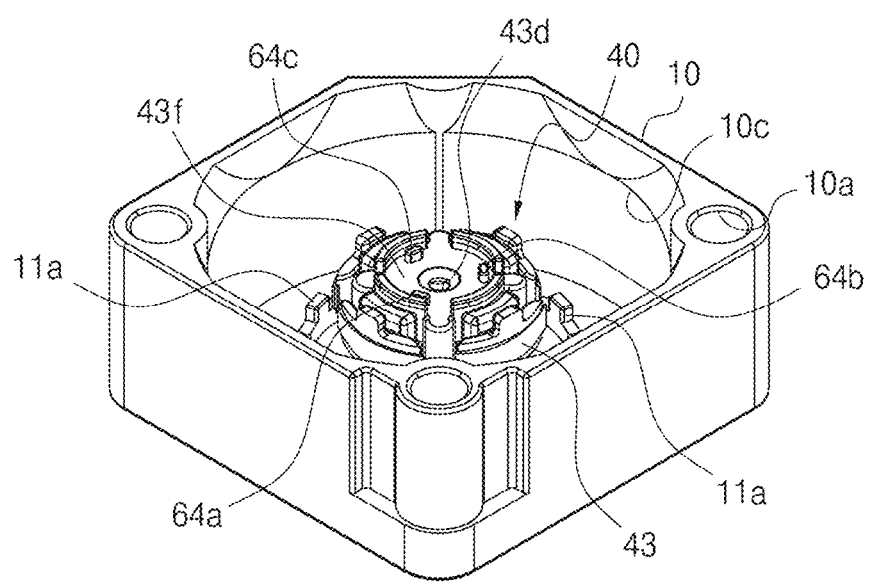
FIG. 7 is a perspective view illustrating a state in which a stator is assembled to a bearing in FIG. 6.
Figure 8:
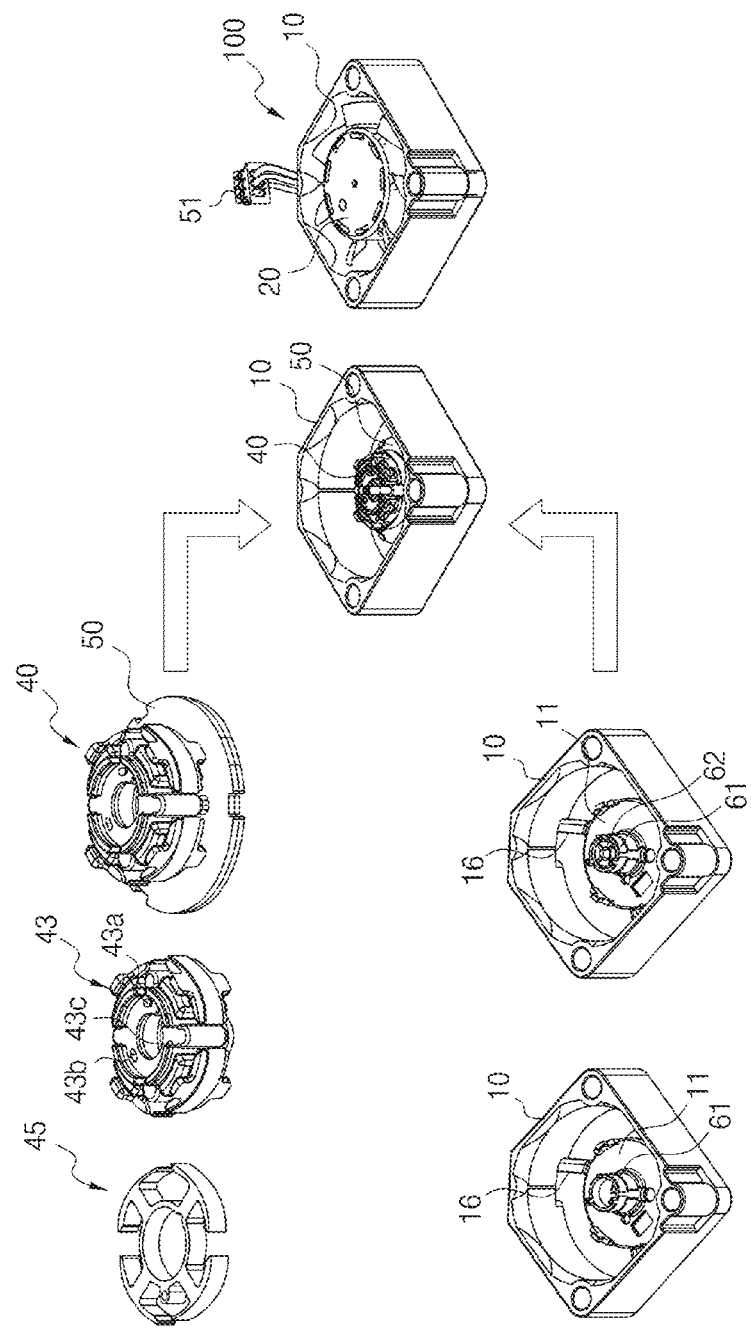
FIG. 8 is an assembly process diagram of a fan according to a preferred embodiment of the present invention.

Moreover, as shown in FIGS. 7 and 8, when the stator 40 is assembled to the sleeve bearing 62, the three connection protrusions 64a to 64c protruding from the bearing housing 61 are coupled to the through-holes 43a and 43b formed in the upper surface 43f of the bobbin 43 and the through-hole 43c communicating with the through-hole 42b of the circular protrusion 42a so that the front end portions of the connection protrusions 64a to 64c protrudes upward from the bobbin 43.

Therefore, in the present invention, when the three connection protrusions 64a to 64c protruding from the top of the bobbin 43 are fused by a high-frequency thermal fusion method, the bearing housing 61 and the bobbin 43 may be easily connected, and as a result, escape and rotation of the stator 40 may be prevented.

In the present invention, three pin terminals 53 are used to connect the coil 44 of the stator 40 and the PCB 50. That is, in this invention, since a fan motor 80 is configured in a single phase motor manner suitable for a small motor, single coil 44 is wound around a stator core 45. Accordingly, the three pin terminals 53 are used to connect the coil 44 of the stator 40 and the PCB 50 to include a start terminal, an end terminal, and a ground terminal of the single coil 44.

Various circuit components of the motor driving circuit for controlling the fan are mounted on the PCB 50, the coil 44 of the stator 40 is electrically connected to the motor driving circuit through three pin terminals 53, and a Hall sensor (not illustrated) is also mounted to generate a rotational position signal of the rotor 30.

Since the lower ends of the pin terminals 53 are soldered and fixed to the PCB 50 in the stator 40, in a state where the three pin terminals 53 are press-fitted through the bobbin 43 as described later, to thereby achieve stable physical support between the stator 40 and the PCB 50.

Figure 3:
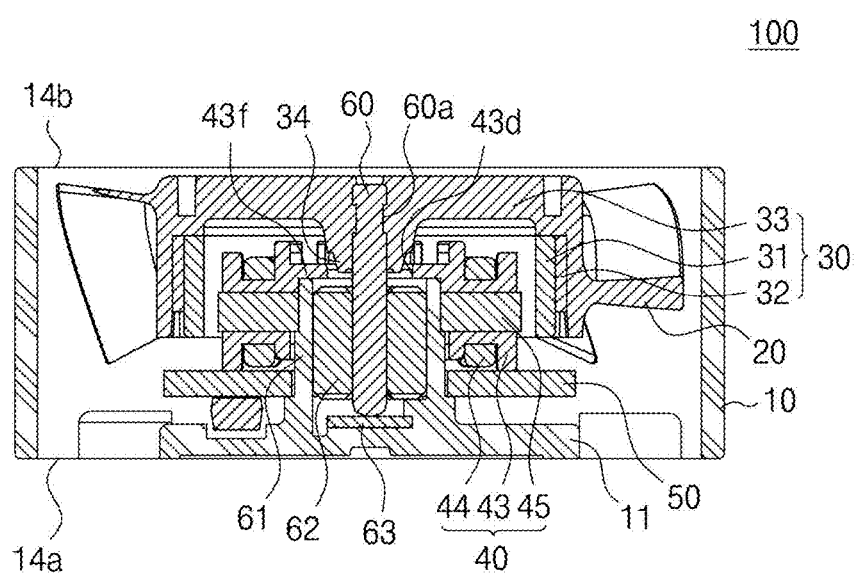
FIG. 3 is a cross-sectional view illustrating a fan according to a second embodiment of the present invention.

Referring to FIG. 3, a fan in accordance with a second embodiment of this invention has an oil-scattering prevention structure slightly different from that of the first embodiment illustrated in FIG. 2, and the remaining portions are the same as those of the first embodiment. Therefore, the same elements as those of the first embodiment are given the same reference numerals as those of the first embodiment, and a detailed description thereof will be omitted.

The fan 100 according to the second embodiment of the present invention has a structure in which the oil-scattering prevention portion 43f of the bobbin 43 extends to the inside of the bearing housing 61, and the lower end of the shaft support portion 34 supporting the rotary shaft 60 of the rotor 30 extends to the inside of the through-hole 43d of the bobbin 43.

The difference between the second embodiment and the first embodiment of this invention is that the lower end of the shaft support portion 34 is formed to be closer to the inside of the through-hole 43d of the bobbin 43 than the first embodiment, instead of the diameter of the through-hole 43d formed in the center of the oil-scattering prevention portion 43f being larger than the first embodiment.

In this case, even if the air and oil inside the bearing housing 61 rise along the rotary shaft 60 due to thermal expansion according to the rotation of the rotor 30, the air and oil are caught by the lower end of the shaft support 34 and the bottom of the oil-scattering prevention portion 43f and return to the inside of the bearing housing 61 again. Therefore, even in the second embodiment, oil-scattering may be prevented without using a separate oil-scattering prevention washer, thereby improving the efficiency of man power (man hour).

Hereinafter, an assembly process of a fan according to an embodiment of the present invention is described with reference to FIG. 8.

First, the stator 40 is formed by covering the coil winding region with an insulator on the outer circumference of the stator core 45 and integrally forming the bobbin 43 with an extended oil-scattering prevention portion 43f on the top by insert injection using resin. The stator 40 is completed by winding the coil 44 around the outer circumference of the coil winding region.

Thereafter, the three pin terminals 53 are press-fitted by passing through the bobbin 43, and one coil end of a start terminal, an end terminal, and a ground terminal of the coil 43 is soldered to the upper end of each pin terminal 53 to be fixed.

Then, when the stator 40 is assembled to the upper portion of the PCB 50 and the lower end of the pin terminal 53 protrudes downward through the pin insertion hole of the PCB 50, the protruding pin terminal 53 and the printed circuit pattern of the PCB 50 are electrically and physically fixed to each other by soldering.

Meanwhile, the base 11 is connected to the rear surface of the fan housing 10 through the plurality of bridges 16, and the bearing housing 61 protrudes from the center of the base 11 to form an integrated body. In this case, the support sheet 63 may be integrally formed on the bottom surface of the recessed portion of the bearing housing 61 by an insert molding manner, when forming the bearing housing 61 and the fan housing 10 with a resin.

Subsequently, the sleeve bearing 62 is assembled inside the bearing housing 61.

Then, the stator 40 having the PCB 50 mounted thereon is coupled to the outer circumference of the bearing housing 61. In this case, the respective front end portions of the three connection protrusions 64a to 64c protruding from the bearing housing 61 protrude upward from the bobbin 43 through through-holes 43a, 43b, and 43c formed in the oil-scattering prevention portion 43f of the bobbin 43.

Subsequently, the connection between the bearing housing 61 and the bobbin 43 is ensured by thermal-fusing the three connection protrusions 64a to 64c protruding to the top of the bobbin 43 with a high-frequency thermal fusion method. As a result, it is possible to prevent the escape or rotation of the stator 40 from or with the bearing housing 61.

Finally, the impeller 20 is integrally formed on the outer circumference of the rotor 30, and the lower end of the rotary shaft 60 passes through the through-hole 43d of the bobbin 43 to be assembled to the sleeve bearing 62.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

This invention provides a fan that may prevent oil-scattering without using a separate oil-scattering prevention washer and prevent a rotary shaft from being escaped by a lift, and may be used for a blowing fan installed in a flow path of a housing for a fine dust sensor to inhale indoor air in a vehicle or a cooling fan used to prevent overheating of electronic components.

What is claimed is:

1. A fan comprising: a fan housing having a cylindrical inner circumferential portion;
   a base connected to the rear surface of the fan housing through a plurality of bridges and having a bearing housing protruding and integrally formed at a central portion thereof;
   a sleeve bearing inserted into the bearing housing;
   a rotary shaft of which a lower portion is rotatably supported by the sleeve bearing;
   a rotor fixed to an upper portion of the rotary shaft;
   a stator which is fixed on the base, has an inner circumferential portion coupled to an outer circumference of the bearing housing, and is arranged with a predetermined gap from the rotor;
   an impeller which is integrally formed on an outer circumference of the rotor and rotates together,
   a plurality of connection protrusions protruding from an upper portion of the bearing housing; and
   a plurality of through-holes penetratively formed in an oil-scattering prevention portion and coupled with the plurality of connection protrusions, respectively, when the stator is assembled to the outer circumference of the bearing housing, wherein front end portions exposed through the plurality of through-holes are fixed to an upper portion of the oil-scattering prevention portion by thermal fusion,
   wherein the stator comprises:
   a stator core in which an inner circumferential portion of a back yoke is fixed to an outer circumferential surface of the bearing housing and a plurality of teeth on which a coil is wound are extended;
   a bobbin surrounding the teeth and the back yoke of the stator core and having the oil-scattering prevention portion located on an upper surface thereof extending to the inside of the bearing housing; and
   the coil wound around the coil winding region of the bobbin and to which a motor driving signal is applied.

2. The fan of claim 1, wherein the inner diameter of a through-hole provided in the inner circumferential portion of the oil-scattering prevention portion is set to be less than the outer diameter of the rotary shaft and greater than the outer diameter of the escape prevention groove.

3. The fan of claim 1, further comprising an inclined portion formed around the through-hole to guide the lower end of the rotary shaft to be inserted into the through-hole.

4. The fan of claim 1, wherein the upper end of the bearing housing comes into contact with the bottom of the oil-scattering prevention portion to induce return to the inside of the bearing housing while preventing oil-scattering.

5. The fan of claim 1, wherein the bobbin further comprises a plurality of circular protrusions each extending from a portion surrounding the teeth and the back yoke between the teeth and having through-holes formed to support the plurality of connection protrusions, respectively.

6. The fan of claim 1, wherein the oil-scattering prevention portion of the bobbin is extended to the inside of the bearing housing, and a shaft support portion supporting the rotary shaft of the rotor is extended so that the lower end thereof approaches the inside of the through-hole provided in the inner circumferential portion of the oil-scattering prevention portion.

7. The fan of claim 1, wherein the bearing housing has a first end groove in which the sleeve bearing is press-fitted and a second end groove in which a lower end portion of the rotary shaft is located.

8. A manufacturing method of a fan, the manufacturing method comprising:
   preparing a fan housing in which a base is connected to a rear surface of the fan housing through a plurality of bridges and a bearing housing protrudes from a central portion of the base to be integrally formed;
   injecting oil into the bearing housing and press-fitting a sleeve bearing to be assembled with the bearing housing;
   preparing a stator core in which an inner circumferential portion of a back yoke is fixed to an outer circumferential surface of the bearing housing and a plurality of teeth on which a coil is wound are extended, and then integrally forming a bobbin by insert injection using a resin wherein the bobbin surrounds the teeth and the back yoke of the stator core and an oil-scattering prevention portion located on an upper surface of the bobbin is extended to the inside of the bearing housing;
   completing a stator by winding a coil around the outer circumference of a coil winding region of the bobbin surrounding the teeth;
   coupling the stator to the outer circumference of the bearing housing to project the front ends of a plurality of connection protrusions protruding from the bearing housing to the upper portion of the bobbin through a plurality of through-holes formed in the oil-scattering prevention portion of the bobbin;
   thermally fusing the plurality of connection protrusions protruding to the upper portion of the bobbin to then be fixed thereto; and
   integrally forming an impeller on an outer circumference of a rotor and then assembling the lower end of a rotary shaft to a sleeve bearing by passing through a through-hole formed in an inner circumference of the oil-scattering prevention portion.

9. The manufacturing method of claim 8, wherein the inner circumferential portion of the oil-scattering prevention portion is extended to be close to an escape prevention groove of the rotary shaft.

10. The manufacturing method of claim 9, wherein the inner diameter of a through-hole formed in the inner circumferential portion of the oil-scattering prevention portion is set to be less than the outer diameter of the rotary shaft and greater than the outer diameter of the escape prevention groove.

11. The manufacturing method of claim 8, wherein the oil-scattering prevention portion of the bobbin is extended to the inside of the bearing housing, and a shaft support portion supporting the rotary shaft of the rotor is extended so that the lower end thereof approaches the inside of the through-hole provided in the inner circumferential portion of the oil-scattering prevention portion.

\* \* \* \* \*